United States Patent
Eckel et al.

(10) Patent No.: US 11,686,880 B2
(45) Date of Patent: Jun. 27, 2023

(54) GENERATING AND CONVEYING COMPREHENSIVE WEATHER INSIGHTS AT FIELDS FOR OPTIMAL AGRICULTURAL DECISION MAKING

(71) Applicant: CLIMATE LLC, Saint Louis, MO (US)

(72) Inventors: Frederick Anthony Eckel, Bothell, WA (US); Gregory Reid Herman, Seattle, WA (US); Christopher Goodman, St. Louis, MO (US)

(73) Assignee: CLIMATE LLC, Saint Louis, MO (US)

( * ) Notice: Subject to any disclaimer, the term of this patent is extended or adjusted under 35 U.S.C. 154(b) by 3 days.

(21) Appl. No.: 17/316,210

(22) Filed: May 10, 2021

(65) Prior Publication Data
US 2022/0018990 A1 Jan. 20, 2022

Related U.S. Application Data

(63) Continuation of application No. 16/831,732, filed on Mar. 26, 2020, now Pat. No. 11,009,625.
(Continued)

(51) Int. Cl.
*G01W 1/10* (2006.01)
*G06N 5/04* (2023.01)
(Continued)

(52) U.S. Cl.
CPC ............... *G01W 1/10* (2013.01); *G06N 5/02* (2013.01); *G06N 5/04* (2013.01); *G06N 20/00* (2019.01); *G01W 2203/00* (2013.01)

(58) Field of Classification Search
CPC ...... G01W 1/10; G01W 2203/00; G06N 5/02; G06N 5/04; G06N 20/00; G06N 3/126
See application file for complete search history.

(56) References Cited

U.S. PATENT DOCUMENTS

| | | | |
|---|---|---|---|
| 7,069,258 B1 | 6/2006 | Bothwell | |
| 7,072,863 B1 * | 7/2006 | Phillips | H04L 47/70 703/2 |

(Continued)

FOREIGN PATENT DOCUMENTS

| | | |
|---|---|---|
| CA | 3042292 A1 | 5/2018 |
| CN | 10640811 | 2/2017 |

(Continued)

OTHER PUBLICATIONS

U.S. Appl. No. 16/831,732, filed Mar. 26, 2020, Eckel et al.
(Continued)

*Primary Examiner* — Tung S Lau
(74) *Attorney, Agent, or Firm* — Harness, Dickey & Pierce, P.L.C.

(57) ABSTRACT

In an embodiment, a computer-implemented method of generating and displaying a comprehensive depiction of a weather element comprises: based on archived forecast model and observed data, training a machine learning model; calibrating current forecast data by applying the machine learning model to yield a calibrated forecast probability density function; displaying graphical representation of recently observed data and calibrated forecast probability density.

19 Claims, 19 Drawing Sheets

Related U.S. Application Data

(60) Provisional application No. 62/824,977, filed on Mar. 27, 2019.

(51) Int. Cl.
*G06N 20/00* (2019.01)
*G06N 5/02* (2023.01)

(56) References Cited

U.S. PATENT DOCUMENTS

| | | | | |
|---|---|---|---|---|
| 7,305,304 | B2* | 12/2007 | Leyton | G06Q 10/0635 |
| | | | | 701/123 |
| 8,521,663 | B1* | 8/2013 | Phillips | G06Q 40/06 |
| | | | | 706/45 |
| 8,935,198 | B1* | 1/2015 | Phillips | G06Q 40/00 |
| | | | | 706/62 |
| 8,954,361 | B1* | 2/2015 | Phillips | H04L 47/70 |
| | | | | 706/12 |
| 9,292,796 | B1 | 3/2016 | Mewes et al. | |
| 10,386,544 | B2* | 8/2019 | Yuan | G06N 7/01 |
| 10,545,263 | B2 | 1/2020 | Kleeman | |
| 10,690,806 | B2 | 6/2020 | Dail | |
| 11,009,625 | B2 | 5/2021 | Eckel et al. | |
| 2003/0126155 | A1 | 7/2003 | Parker | |
| 2004/0102937 | A1* | 5/2004 | Ibrahim | G05B 13/048 |
| | | | | 703/2 |
| 2006/0085164 | A1* | 4/2006 | Leyton | G01W 1/10 |
| | | | | 702/179 |
| 2006/0106743 | A1* | 5/2006 | Horvitz | G06N 20/00 |
| | | | | 706/21 |
| 2011/0307109 | A1 | 12/2011 | Sri-Jayantha | |
| 2013/0138289 | A1 | 5/2013 | Sauder et al. | |
| 2013/0247655 | A1 | 9/2013 | Preiner et al. | |
| 2014/0195159 | A1 | 7/2014 | Mewes | |
| 2015/0254800 | A1 | 9/2015 | Johnson | |
| 2015/0317589 | A1* | 11/2015 | Anderson | G06Q 10/06315 |
| | | | | 705/7.25 |
| 2016/0050840 | A1 | 2/2016 | Sauder et al. | |
| 2018/0225585 | A1* | 8/2018 | Dong | G06N 3/04 |
| 2020/0200897 | A1 | 6/2020 | Eckel | |
| 2020/0309994 | A1* | 10/2020 | Eckel | G06N 5/04 |

FOREIGN PATENT DOCUMENTS

| | | |
|---|---|---|
| CN | 103440400 | 2/2017 |
| CN | 109376913 A | 2/2019 |
| CN | 110611333 | 12/2019 |
| CN | 110689184 | 1/2020 |
| CN | 11079712 | 2/2020 |
| CN | 107578134 | 5/2020 |
| EP | 2818899 A1 | 12/2014 |
| KR | 1035398 | 5/2011 |
| WO | WO 2009/086560 | 7/2009 |
| WO | WO 2015/182142 | 12/2015 |

OTHER PUBLICATIONS

The International Searhcing Authority, "Search Report" in application No. PCT/US2020/025435, dated Jun. 23, 2020, 17 pages.

Current Claims in application No. PCT/US2020/025435, dated Jun. 2020, 6 pages.

Byass et al., "Assessing Population's Exposures to Heat and Humidity: An Empirical Approach", On: Global Health Action, dated Sep. 17, 2010, 6 pages.

Eckel, U.S. Appl. No. 16/831,732, filed Mar. 26, 2020, Notice of Allowance, dated Mar. 10, 2021.

Eckel, U.S. Appl. No. 16/831,732, filed Mar. 26, 2020, Office Action, dated Dec. 28, 2020.

* cited by examiner

Fig. 2
(a)
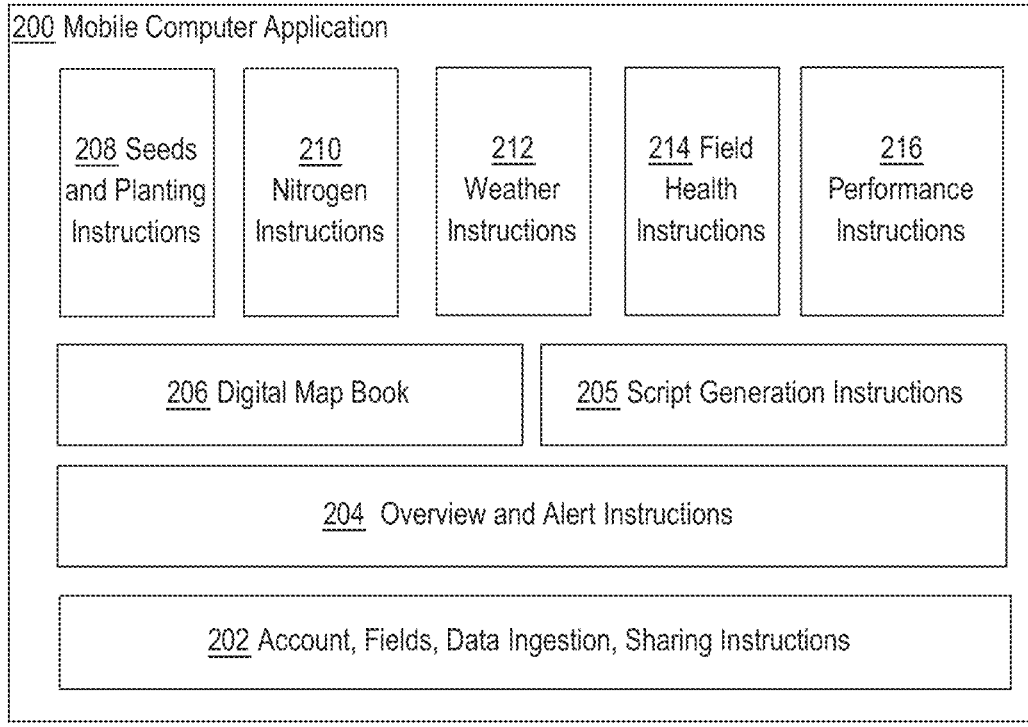
(b)
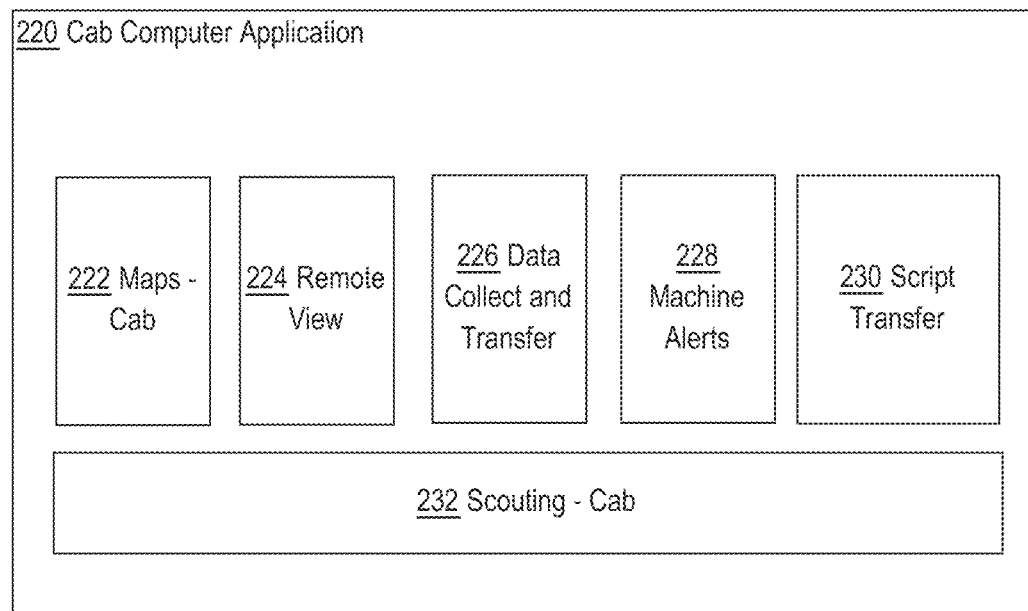

FIG. 5

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

+ Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | -- | DMC82-M | 112 | 160 | 34000 | Apr |
| ☐ Austin, MN 1<br>Corn \| 100 \| Fredricks, MN | Corn | -- | DMC82-M | 114 | 160 | 36000 | Apr |
| ☐ Boone, IN 1<br>Corn \| 100 \| Boone, IA | Corn | -- | DMC82-M | 112 | 150 | 34000 | Apr |
| ☐ Champaign 1<br>Corn \| 100 \| Champaign, IL | Corn | -- | -- | 112 | 200 | 34000 | Apr |
| ☐ E Nebraska 1<br>Corn \| 100 \| Burt, NE | Corn | -- | -- | 112 | 160 | 34000 | Apr |

*FIG. 6*

| Period | Data Increment | 4X Observed Length | 10X Forecast Length |
|---|---|---|---|
| Imminent | 15 Minutes | 1 Hour | 2.5 Hours |
| Soon | 30 Minutes | 2 Hours | 5 Hours |
| Work Day | 1 Hour | 4 Hours | 10 Hours |
| Full Day | 3 Hours | 12 Hours | 30 Hours |
| Couple Days | 6 Hours | 1 Day | 2.5 Days |
| Work Week | 12 Hours | 2 Days | 5 Days |
| Full Week | 24 Hours | 4 Days | 10 Days |
| Season | 1 Week | 4 Weeks | 10 Weeks |
| Year | 1 Month | 4 Months | 10 Months |

FIG. 11

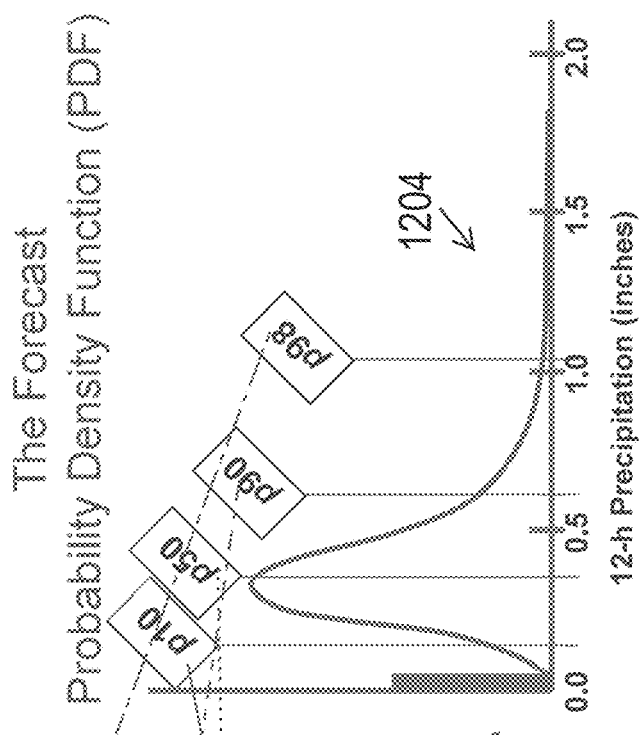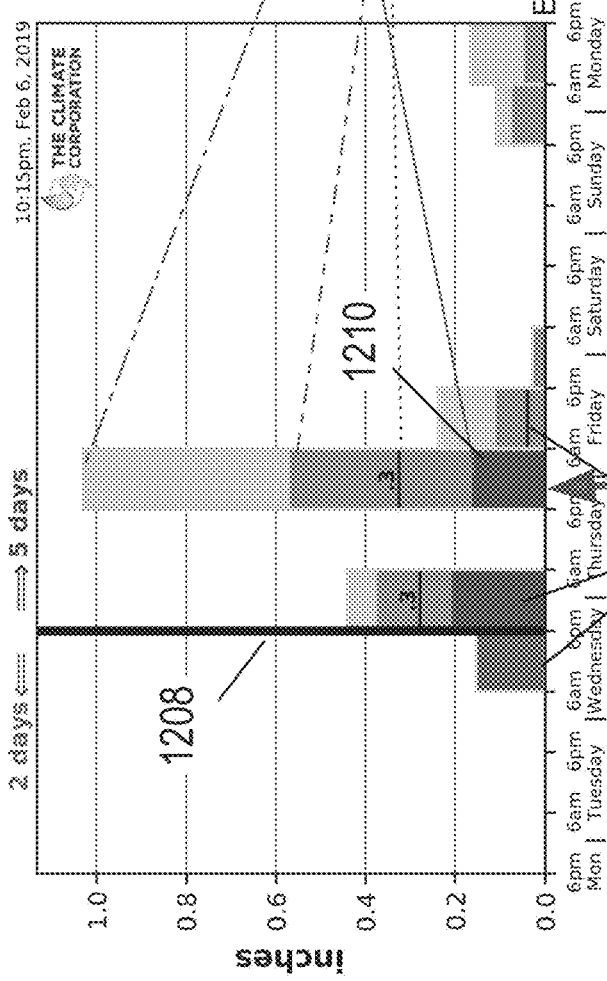
FIG. 12

Aim is to apply "*potential precipitation*" information to decision making intuitively, scanning visually through a lot of information.

GENERATING AND CONVEYING COMPREHENSIVE WEATHER INSIGHTS AT FIELDS FOR OPTIMAL AGRICULTURAL DECISION MAKING

CROSS-REFERENCE TO RELATED APPLICATIONS; BENEFIT CLAIM

This application claims the benefit under 35 U.S.C. § 120 as a Continuation of application Ser. No. 16/831,732, filed Mar. 26, 2020, which claims the benefit under 35 U.S.C. § 119(e) of provisional application 62/824,977, filed Mar. 27, 2019, the entire contents of which are hereby incorporated by references for all purposes as if fully set forth herein. Applicant hereby rescinds any disclaimer of claim scope in the parent application or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

One technical field of the present disclosure is calibration of weather forecast models based on archived forecast performance to adjust for persistent model biases and errors in the weather forecast models. Another technical field of the present disclosure is real time application of an adjusted weather forecast model to latest forecast data for improved predictions. Another technical field of the present disclosure is training a behavioral algorithm to learn weather data relationships. Another technical field of the present disclosure is utilizing machine learning algorithms to calibrate weather forecast models. Another technical field of the present disclosure is displaying comprehensive user interface-based graphical representations of observed and forecast weather data, including forecast uncertainty to aid in decision making, risk management, and planning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Contemporary methods of interpreting weather information provide insufficient data to optimally support growers' planning decisions. Growers are often not in a position to make the best possible decisions relating to planting, spraying, irrigation, harvest, among other aspects of farming with present weather utilization practices. This shortfall negatively impacts farming operations by causing growers to make poor or non-optimal decisions using incomplete, inadequate, and/or insufficient information.

Observed weather data, properly utilized, can be useful information to a grower during agricultural processes. At times, growers benefit from fine granularity data relating to aspects of crop management, but current methods only allow for coarse granularity data to be utilized. For example, while weather data may include measured amounts, such as a 24-hour precipitation total of 0.5 inches of rain, but it may omit details of the precipitation source, for example, a brief rain downpour that largely travelled into runoff instead of a slow rain throughout the day that was well-absorbed into the soil. In each scenario, a grower might reasonably make a different decision based on a goal that is influenced by the weather.

Among all types of forecast data, the precipitation forecast is arguably the most crucial forecast data for growers' decision making. The predicted amount of rain and the uncertainty of rain occurring must be known to effectuate optimal decision-making. Today, growers rely on either a deterministic, single-valued precipitation forecast and/or a probability-of-precipitation (PoP) forecast. Both of these options fall short of providing a comprehensive precipitation forecast and can even cause confusion when used together incorrectly. A deterministic forecast carries no descriptions of uncertainty, forecast confidence, or its potential magnitude of error. A PoP forecast merely describes a chance occurrence of any precipitation amount, massive or minute, leaving the predicted amount a mystery which affects growing practices. For example, a PoP of 100% (i.e. a certainty of incoming rain) could describe a variety of situations, from a light drizzle to an epic flooding event.

Simply providing additional information to growers, observed and forecast, is not helpful for sound decision-making. With respect to the precipitation example above, an increase in the amount of information provided to growers may prove confusing and overwhelming to them, particularly with highly variable weather patterns and when multiple growers utilizing multiple fields are involved. What is needed is a useful and efficient ability to convey the vast amounts of weather forecast information necessary to optimize field practices to growers or other interested parties.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 11 shows an example table data relating to weather forecast.

FIG. 12 shows an example precipitation bar chart graph and corresponding PDF graph.

DETAILED DESCRIPTION

Figure 1:
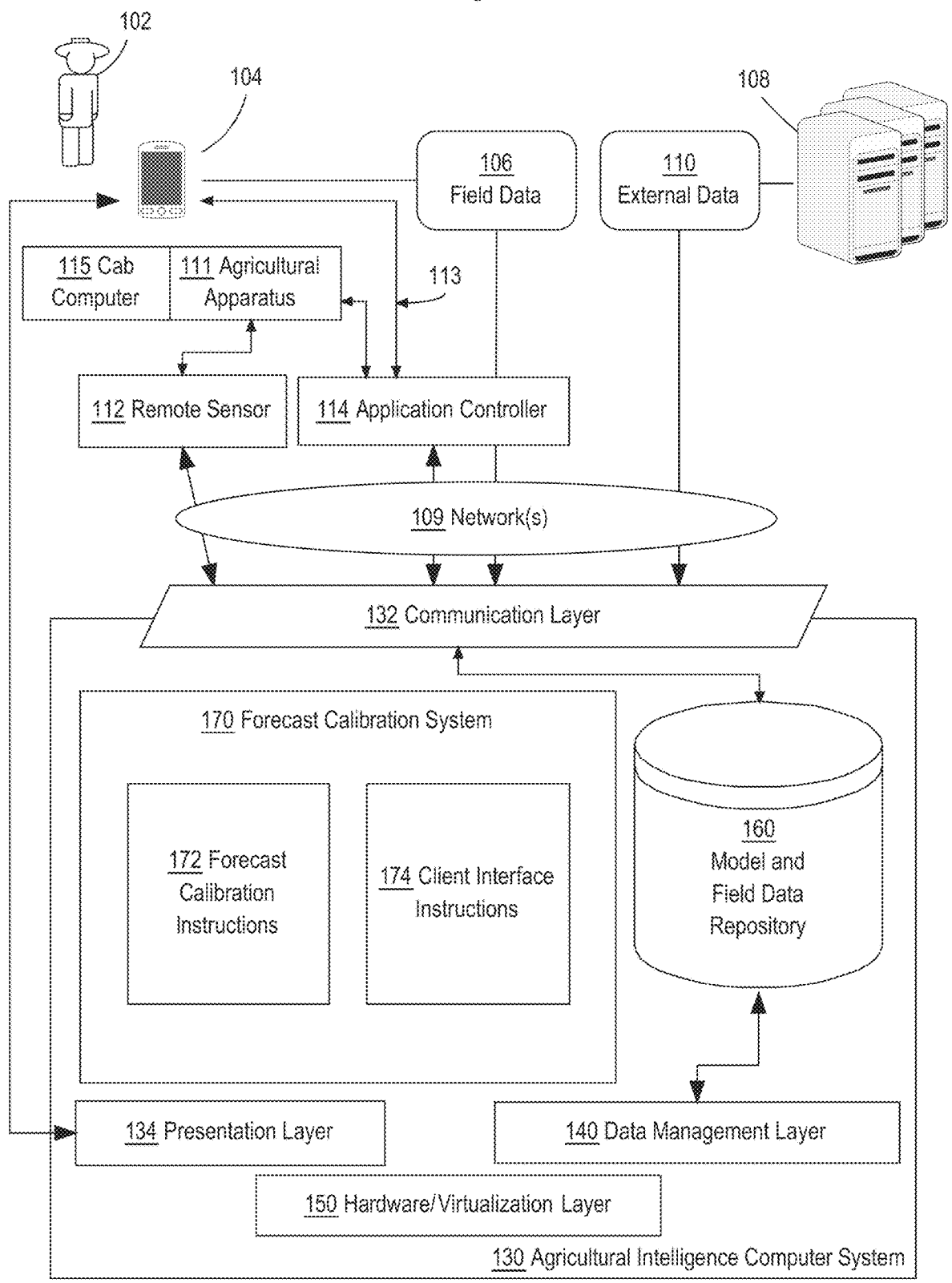
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE SYSTEM FOR FORMULATION AND DISPLAY OF COMPREHENSIVE WEATHER INFORMATION
   3.1 FORECAST CALIBRATION VIA MACHINE LEARNING
   3.2 GRAPHICAL USER INTERFACE
4. OTHER ASPECTS OF DISCLOSURE
5. PRACTICAL APPLICATIONS
6. BENEFITS OF CERTAIN EMBODIMENTS

1. General Overview

Growers stand to benefit considerably from effective farm operation planning. Short and long-term planning, when supported by comprehensive information utilizing dependent factors, with regard to weather in particular, can lead to risk reduction or elimination and greater profitability. For example, rather than irrigating all fields of a geographically well dispersed farming operation, a grower can plan to irrigate some fields and avoid irrigating others based on comprehensive precipitation prediction information. Precipitation prediction information can include details of recent rainfall and/or forecast amounts for each field over various spaces and at various times, providing an objective description of forecast uncertainty. The capability to optimally plan and execute an irrigation schedule across various fields increases crop gains and efficient water utilization, but only when these practices are based on well-understood, reliable, and comprehensive weather information. A fundamental tenet of decision theory and risk analysis is inclusion and consideration of uncertainty. Perfecting use of uncertainty information is critical to optimizing any decision process in the agricultural profession.

Where a weather forecast is input, the prediction for any weather element can be formulated as a forecast probability distribution function (PDF) that describes the spectrum of future possibilities based on the accuracy and makeup of the underlying weather model and weather observation system. The forecast PDF can be effectively applied to a decision process in many different ways, from formal a comparison of the probability of a particular event to a risk tolerance calculation to conveying key aspects of the PDF to the decision maker.

Formulation of a high quality, reliable, and precise forecast PDF is possible by utilizing post-processing calibration techniques for an ensemble weather model. An ensemble weather model is a collection of individual weather models combined to capture possible future states of the atmosphere. Post-processing of the ensemble's output corrects for a weather model's deficiencies by applying knowledge of how the ensemble performed in the past. The ensemble's inability to properly capture the exact and true state of the atmosphere using a weather model is remedied by comparing the ensemble's predictions to actual, verified, and observed weather data over a long history of forecast data. Post-processing calibration is one application of that information to adjust and complete a raw ensemble forecast.

A machine learning (ML) model may be used to accomplish post-processing calibration. The ML model is trained to detect differences between field-specific archived ensemble weather model data and field-specific archived observed data. When applied to a current, real-time ensemble model, the ML algorithm generates a trained forecast PDF for specific field locations that better represents observed data as archived data is continuously trained upon. Calibrated field-specific forecast PDFs, along with detailed, field-specific, and recently observed data, are provided to a forecasting graphical user interface (GUI) for graphical representation to a grower by a client computing device.

In an embodiment, comprehensive weather information, including both weather observations and/or forecasts coupled with well-defined areas of uncertainty is useful in assisting with planning of farming operations, namely by reducing or eliminating risk factors. Data increments and periods of weather data which are presented and selectable on a graphical user interface (GUI) assists a user with both short and long-term decision processes for growing. For example, displaying weather information in selectable 30-minute data increments over the course of a few hours for a future time period is useful for a user to make short-term grower decisions and daily planning operations. For long-term decisions, such as planning an upcoming harvest, displaying selectable one-day data increments for a field can prove immensely useful. Other aspects features and embodiments will become apparent from the disclosure as a whole.

2 Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
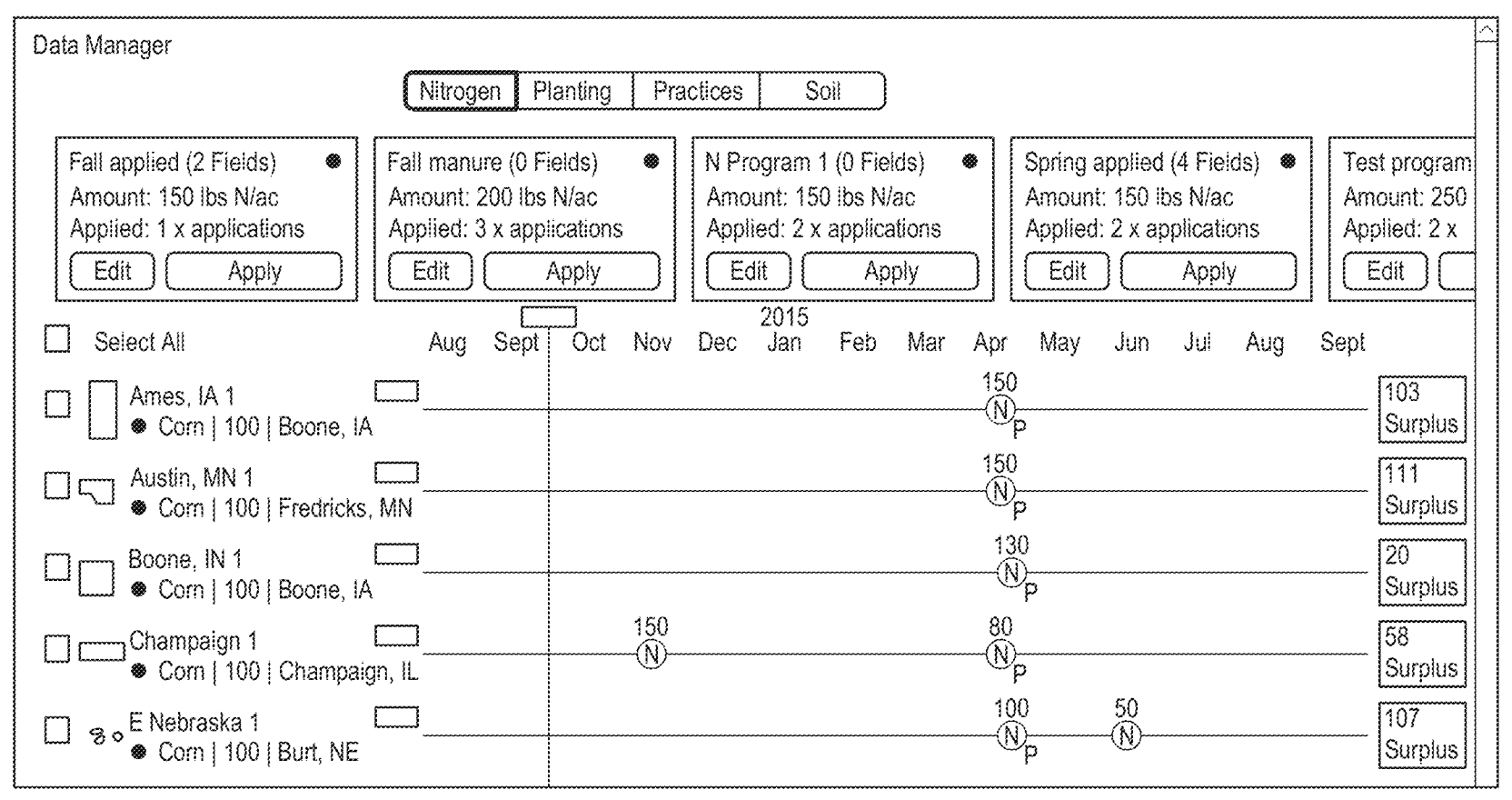

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data. In an embodiment, image retrieval instructions 136 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the image retrieval instructions 136 may comprise a set of pages in RAM that contain instructions which when executed cause performing obtaining data from an unmanned aircraft system (UAS)-carried imaging system 700 as further described herein, for further analysis.

In an embodiment, the agricultural intelligence computer system 130 comprises forecast calibration system 170. In an embodiment, the system 170 comprises executable instructions that when executed cause the forecast calibration system 170 to perform the functions or operations that are described herein with reference to those modules. For example, the system 170 comprises forecast calibration instructions 172 and client interface instructions 174 that when executed cause the forecast calibration system to perform the functions or operations described herein with reference to those modules. In an embodiment, forecast calibration system 170 may comprise a set of pages in RAM that contain instructions which when executed cause performing the target identification functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the image retrieval instructions 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
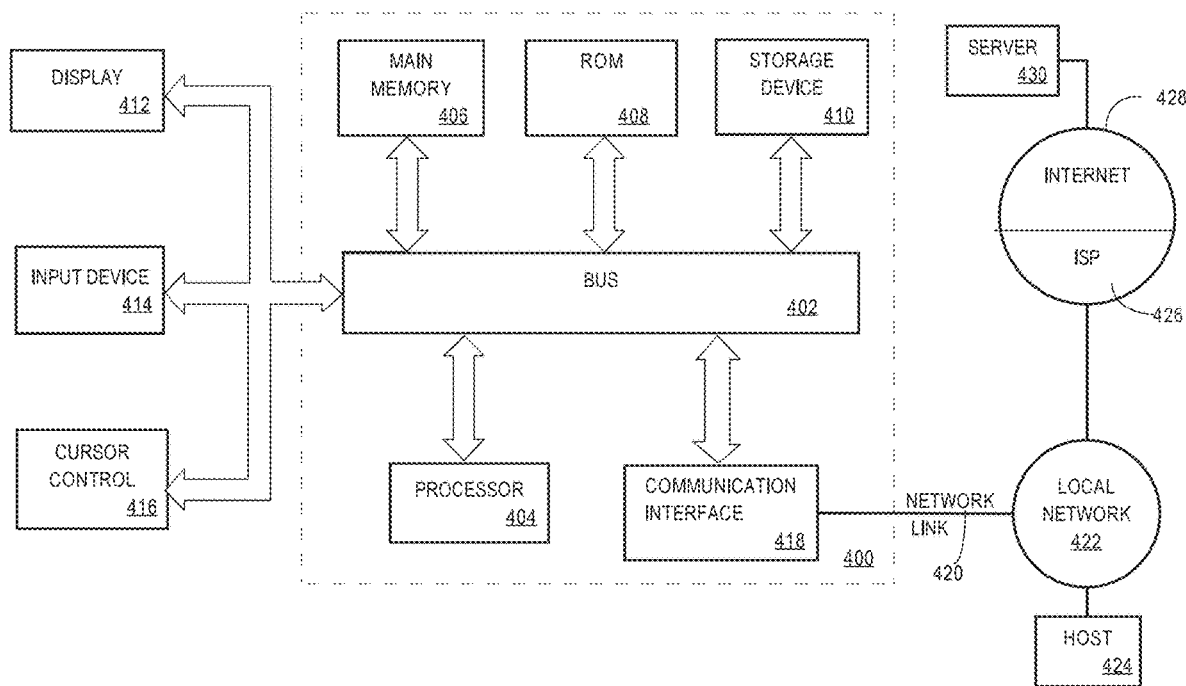
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2 Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3 Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
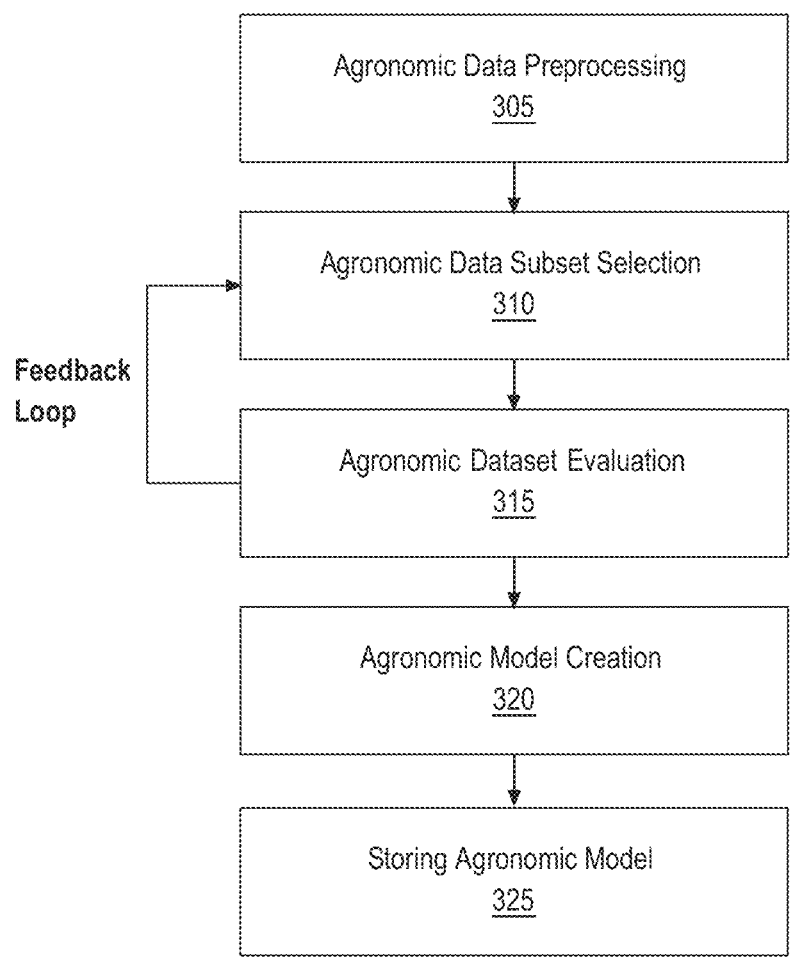
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against archived agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System for Formulation and Display of Comprehensive Weather Information Having access to and utilizing past and present weather condition information is critical to decision-making, planning and risk management for growers. Farming operations are greatly impacted by various weather elements including precipitation, temperature, wind, humidity, among others. Weather data, including historical data, present observations, and future forecasts, while publicly available and useful, offer limited utility to a grower due to 1) temporal and spatial coarseness, 2) poor calibration, 3) little or no forecast uncertainty information, and 4) lack of a data interface design tailored to directly support growers' use cases. These issues are addressed by a) acquiring high quality, archived and current, weather data, b) training and applying post-processing calibration using machine-learning, and c) constructing a tailored graphic user interface. Growers require a convenient, simplistic, and comprehensive view of weather element forecasts that convey all necessary information for a field at a given time without obfuscating important and crucial details in order to optimize growing procedures.

3.1 Forecast Calibration Via Machine Learning

A weather forecast, for any weather element, is best represented as a PDF (Probability Density Function) that describes the potential range and likelihood of future values of that element based on the limits of predictability attributable to deficiencies in contemporary weather models and observational equipment. A forecast PDF constructed from raw ensemble weather model data is biased and often fails to accurately quantify the full range of possibilities for future values of that weather element and the corresponding likelihood of those values. Weather events predicted from flawed PDFs cannot easily and efficiently be used by growers to maintain a field at an optimal pace.

Post-processing of the raw ensemble weather model output using a trained machine learning model generates a well calibrated forecast PDF that lowers agricultural risk factors and improves planning for future events. A calibrated forecast PDF is reliable while simultaneously being as precise and narrowly tailored to certain tasks as possible.

In one embodiment, many past instances of computer-generated ensemble weather model output, spanning long periods of time—in some cases decades—are acquired and matched up with verifying weather observations over the same archived cases. Machine learning-based training is executed and utilizes this data. In one embodiment, in post-processing, the trained ML model is input with real-time data ensemble weather model data and the result is displayed using a graphical user interface of a user computer during or subsequent to the generation of the result. Displays may be in mobile in-cab computers in the field, or other host computers at grower premises.

In one embodiment, real-time action refers to the agricultural intelligence computer system executing one or more operations immediately after receiving input from one or more entities, or within a few seconds of receiving the data. In one embodiment, near real-time action refers to the agricultural intelligence computer system executing one or more operations within a period of time comprising a relatively short delay or response period between the reception of an input and the execution of action responsive to the input.

In an embodiment, a variety of periodically updated high quality observed and forecast precipitation data are received from one or more public sources and post-processed to improve and adapt a weather element to a desired attribute or relationship specified in the model. In an embodiment, periodically updated observed and forecast precipitation data are received from one or more public sources and post-processed to improve and adapt a weather-based model prediction associated with a field location. For example, a weather-based model prediction may be a prediction for conditions of precipitation, wind, temperature, or other attributes associated with weather experienced by a field.

Figure 7:
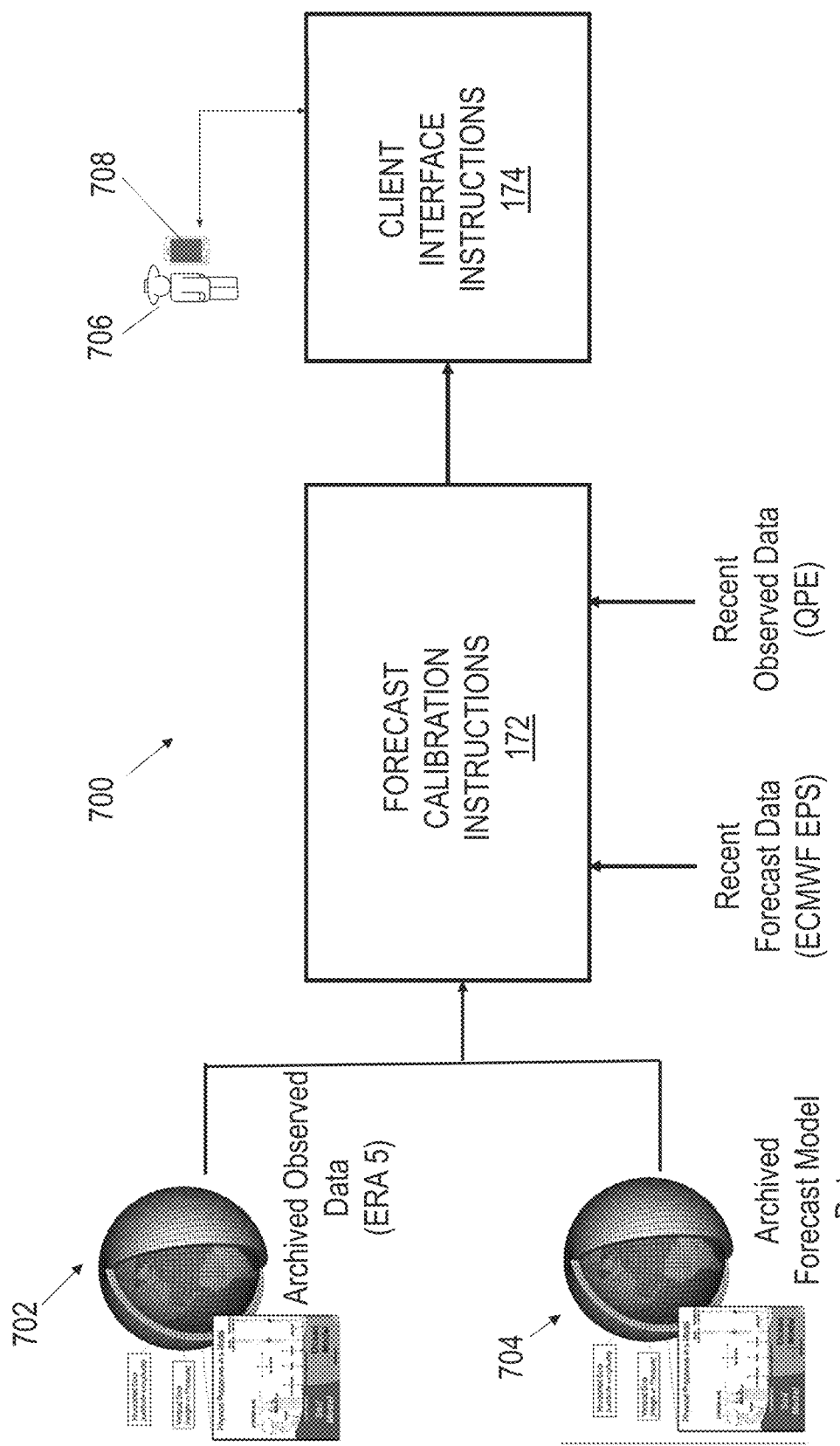
FIG. 7 illustrates an example forecast calibration system.

FIG. 7 illustrates an example forecast calibration system. In an embodiment, the system 170 of FIG. 1 is configured in the manner shown for system 700 of FIG. 7.

In an embodiment, forecast calibration system 700 may use preexisting, previous output from forecast models and preexisting observed data to train a forecast calibration algorithm for any weather element and apply the trained calibration algorithm in real time to current output from the same forecast models to generate an improved, current forecast for one or more fields. Preexisting forecast model data of one or more fields are from previous executions of the same weather model currently in use, and cover one or more fields. Preexisting observed data of one or more fields may be based on gridded weather analysis covering one or more fields. Observation data used to prepare the gridded analysis may be procured by in-situ weather instruments, satellite, weather radar, and other adequate equipment for sensing and viewing weather elements.

In an embodiment, weather forecast model output is modified based on past comparisons with observed data to increase accuracy of the forecast. Modification may include behavioral learning process based on comparison of ground truth or observed data that compares predicted results with actual results on a field, such as a comparison of precipitation estimates with a rain gauge or sensor providing weather element data at the same or nearby location. In an embodiment, modification may include training a machine learning algorithm with continual comparisons of field-specific archived observed data to corresponding field-specific past executions of forecast models and modifying the field-specific forecast model output based on the result of the comparisons.

In an embodiment, the trained machine learning algorithm is applied in real time to the current field-specific forecast model output to adjust the forecast for greater skill in the weather element forecast. In an embodiment, adjusting may implement calibration of field-specific current forecast model output to generate a reliable and precise PDF for a weather element. Calibration or adjustment of the current forecast model output effectively proportionally shifts the corresponding forecast PDF.

In an embodiment, a field-specific calibrated current forecast of a weather element is displayed on a viewing screen in graphical representation on or via a user interface. In an embodiment, corresponding field-specific recently observed data is additionally displayed on the viewing screen in graphical representation on or via a user interface. In an embodiment, graphical representation of the field-specific calibrated current forecast of a weather element and corresponding field-specific recently observed data are presented side-by-side, seamlessly displaying the weather element for both past and future times. For example, at a bar chart graph timeline, future (forecast) precipitation immediately follows past observed precipitation. A gap defines a period between the end of the observed period and the beginning of the forecast period includes a current period or "now". An initial period forms between the end of the observed period and ahead of the beginning of the forecast period. In an embodiment, a temporal processor blends the field-specific calibrated current forecast model of a weather element with the corresponding field-specific recently observed data to cover the gap with forecast data. Covering this gap ensures continuity of the graphical representation of the timing view.

Referring again to FIG. 7, in an embodiment, forecast calibration instructions 172 are programmed to implement field-specific forecast model calibration based on archived cases of the same forecast model 704 matched up with archived observed data 702. In an embodiment, archived forecast model data and archived observed data are retrieved from public sources. For example, without limitation, archived forecast model data may be retrieved from an archive of output data from the European Centre for Medium-Range Weather Forecasts Ensemble Prediction System (ECMWF EPS). ECMWF provides global forecasts, climate reanalysis via the web, point-to-point dissemination, data servers and broadcasting. Datasets are typically updated two times per day. ECMWF EPS forecasts depict the range of possibilities for how global weather may evolve by producing ensembles of predictions. Each ensemble is a full description of the evolution of the weather. Collectively, ensembles indicate the likelihood of a range of future weather scenarios. One ensemble forecast may consist of 51 separate forecasts made by the same computer model, all activated from the same starting time. The starting conditions for each member of the ensemble are slightly different, and physical parameter values used also differ slightly. Differences between these ensemble members tend to grow as the forecasts progress, that is, uncertainty and error in model predictions grow with increasing forecast lead times. In an embodiment, past cases of forecast model output may be collected from the same source or from one or more different sources.

In an example embodiment, archived observed data 702 may be from European Reanalysis 5 (ERA5). ERA5 is the latest climate reanalysis produced by ECMWF. ERA5 datasets are publicly available back to 1950 and up to within three months of the present time. ERA5 combines vast amounts of archived observations into global estimates using advanced modeling and data assimilation systems. ERA5 has a long use history of many years, and is generally conducive to training machine learning models. In an embodiment, archived observed weather data from sources other than ERA5 may be employed. In an embodiment, different archived forecast and observation sources may be employed. In an embodiment, archived observed data 702 and archived forecast model data 704 are field-specific.

Training behavioral model includes programming forecast calibration instructions 172 to identify differences between observed data 702 and forecast model data 704 at a specific field location over a long history of matchings of those data. In an embodiment, the learned differences between field-specific forecast model data and observed data determines an adjustment to be applied to current field-specific forecast model data to account for the adverse effect of biases within the forecast model due, for example to coarse granularity associated with forecast model. Adjustment to the forecast model data increases prediction performance because forecast model data, such as data 704, converges toward the observed data, such as data 702.

In an embodiment, observed data is generated by one or more programmed or configured in-field or remote sensors, satellite, laser or via different observation devices.

In an embodiment, forecast calibration instructions 172 may be further programmed to cause the system 700 to receive recent observed data. In an embodiment, observed data may be field or geolocation specific. In an embodiment, source of observed data may be based, at least in part, on a desired weather element. For example, forecasting precipitation may be better described with a weather radar and rain-gauge based quantitative precipitation estimation (QPE) as the source of observed recent data. Such QPE tends to have finer resolution and shorter data latency. In an embodiment, a different source or multiple sources may be employed.

In an embodiment, forecast calibration instructions 172, when executed, implements calibration of the most current forecast model data. In an embodiment, client interface instructions 174, when executed, cause field-specific graphical representations of calibrated forecast data, via client interface instructions 174, on client computing device 708 for viewing by user 706.

Figure 8:
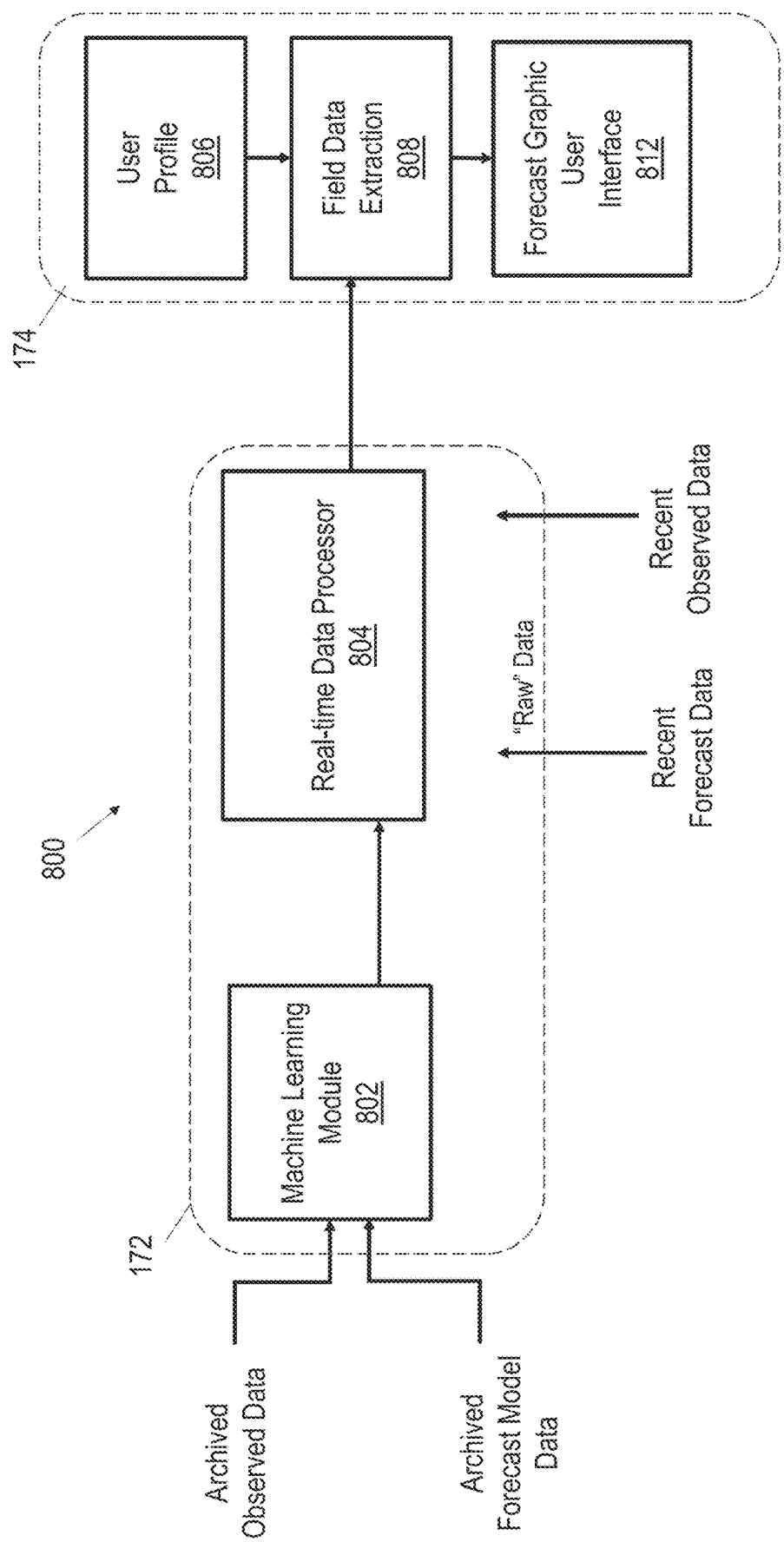
FIG. 8 shows an example embodiment of a forecast calibration system.

FIG. 8 shows an example embodiment of a forecast calibration system. In an embodiment, a forecast calibration system is the forecast calibration system 800. The system 800 includes machine learning module 802, real-time data processor 804, field data extraction 808, forecast graphic user interface 812, and user profile 806. In an embodiment, module 802 and data processor 804 are instructions, analogous to the instructions 172. In an embodiment, module 802 and data processor 804 are hardware modules, software modules, virtual modules or a combination thereof. In an embodiment, user profile 806, field data extraction 808, and forecast graphic user interface 812 are instructions, analogous to the instructions 174. In an embodiment, user profile 806, field data extraction 808, and forecast graphic user interface 812 are hardware modules, software modules, virtual modules or a combination thereof. In an embodiment, user profile 806, field data extraction 808, and forecast graphic user interface 812, or a combination thereof, are not local to the system 800. In an embodiment, user profile 806, field data extraction 808, and forecast graphic user interface 812, or a combination thereof, are remotely communicatively coupled to the system 800. In an embodiment, user profile 806, field data extraction 808, and forecast graphic user interface 812 or a combination thereof are stored in a storage device, such as a database, memory, server, among other types of storage devices. In an embodiment, user interface 812 or a portion thereof is a part of a client computing device or communicatively coupled to the client computing device. For example, the interface 812 may be a part of the client device 708 (FIG. 7) or communicatively coupled to the client device 708.

In an embodiment, machine learning module 802 is a behavioral learning model. In accordance with an example embodiment, the forecast machine learning algorithm is a quantile regression forest. In an embodiment, a different type of machine learning algorithm may be employed.

In an embodiment, module 802 is configured or programmed to receive archived observed data and archived forecast model data from one or more publicly available sources as discussed above. In an embodiment, module 802 implements a machine learning algorithm trained by comparison of archived cases of the forecast model with archived observed data and then applied to the current output of the forecast model. In an embodiment, data processor 804 is configured or programmed to interoperate with module 802. In an embodiment, data processor 804 operates in real time. In an embodiment, data processor 804 is configured or programmed to receive the trained machine learning model, generated by module 802, and calibrates the recent forecast data ("raw" data), in real time, using the trained machine learning model. Calibrated recent forecast data are provided to field data extraction 808. Optionally, data processor 804 is configured or programmed to receive recent observed data and provides the recent observed data to field data extraction 808.

In an embodiment, calibration results match an extent to which the forecast accurately predicts actual weather. Applying a calibration routine to forecast model output is effectively an adjustment to PDF of the raw forecast model data. In an embodiment, data processor 804 is configured or programmed to receive current forecast data in real time. The differences between the forecast model data and observed data, learned using the archived data comparisons, determines the requisite adjustments to the forecast model. The adjustments are reflected in the trained machine learning model, output of the module 802. Data processor 804 attempts to calibrate the forecast model output towards ground truth or observation data.

In an embodiment, user profile 806 includes volumes of data relating to growers and grower fields. For example, user profile 806 includes field geolocation, field dimensions, plot boundary, field crop map, and the like. In an embodiment, user profile information, output of user profile 806, is locally stored. In an embodiment, user profile information is remotely stored.

In an embodiment, user profile information includes field identification. For example, user profile data may include geolocation of a field. In an embodiment, field data extraction 808 extracts in real time calibrated current forecast data and recently observed data from data processor 804 for the field identified by user profile data. In an example, field data extraction 808 extracts data in real time. In an embodiment, field data extraction 808 updates user interface 812 with calibrated current forecast data and recently observed data at a predetermined frequency. For example, field data extraction 808 may extract recent forecast data and recently observed data for one or more fields from user profile 806 every hour and overwrite previous graphically represented data with current forecast and observed data. In an embodiment, field data extraction 808 is configured or programmed to extract weather element forecast and observed data from data processor 804 for a specific field, identified by user profile data.

In an embodiment, field data extraction 808 is configured or programmed to update user interface 812 with graphical representation of the extracted weather element forecast and observed data at specific time data intervals. For example, field data extraction 808 may extract precipitation forecast and observed data from data processor 804 for a specific field and may update user interface 812 with graphical representation of the extracted forecast and observed precipitation data for the specific field every hour. In an embodiment, field data is presented at a grower time zone or at a field geolocation time zone. In an embodiment, time zone adjustment allows field data extraction 808 to select forecast and observed data for time intervals that align with local daily time breakouts. For example, a 6-hour data interval over a time period of past observed through future forecast data display for at field data would employ extraction 808 to retrieve 6-hourly data over the period starting at local time 12 am, 6 am, 12 pm, or 6 pm, depending upon the exact period of interest.

Feeding the machine learning algorithm, a long history of matched up spatial and temporal forecasts and verifying observations, effectively trains the algorithm in detecting complex relationships between the weather model and ground truth. For example, assuming training the machine learning algorithm over many past years of matched forecasts and verifying observations relative to a specific field results in the following scenario. On 26 separate occasions, the machine learning model has noticed, at a specific field in late afternoon summer when the wind blows from the south, the forecast precipitation verifies on average 25% lower than ground truth. After training, during operation, module 802 looks for any instance in the forecast at that same field when there is late afternoon summer precipitation and the wind is coming from the south. Upon data processor 804 detecting that foregoing scenario, data processor 804 increases the precipitation forecast by 25%, thus like making an adjustment that makes the forecast closer to truth. A longer history of training data has a greater effect on improving forecasts. In the example above, repeating the steps over the course of countless times, locations, and weather variables allows the machine learning algorithm to learn an amazing number of relationships.

Figure 9:
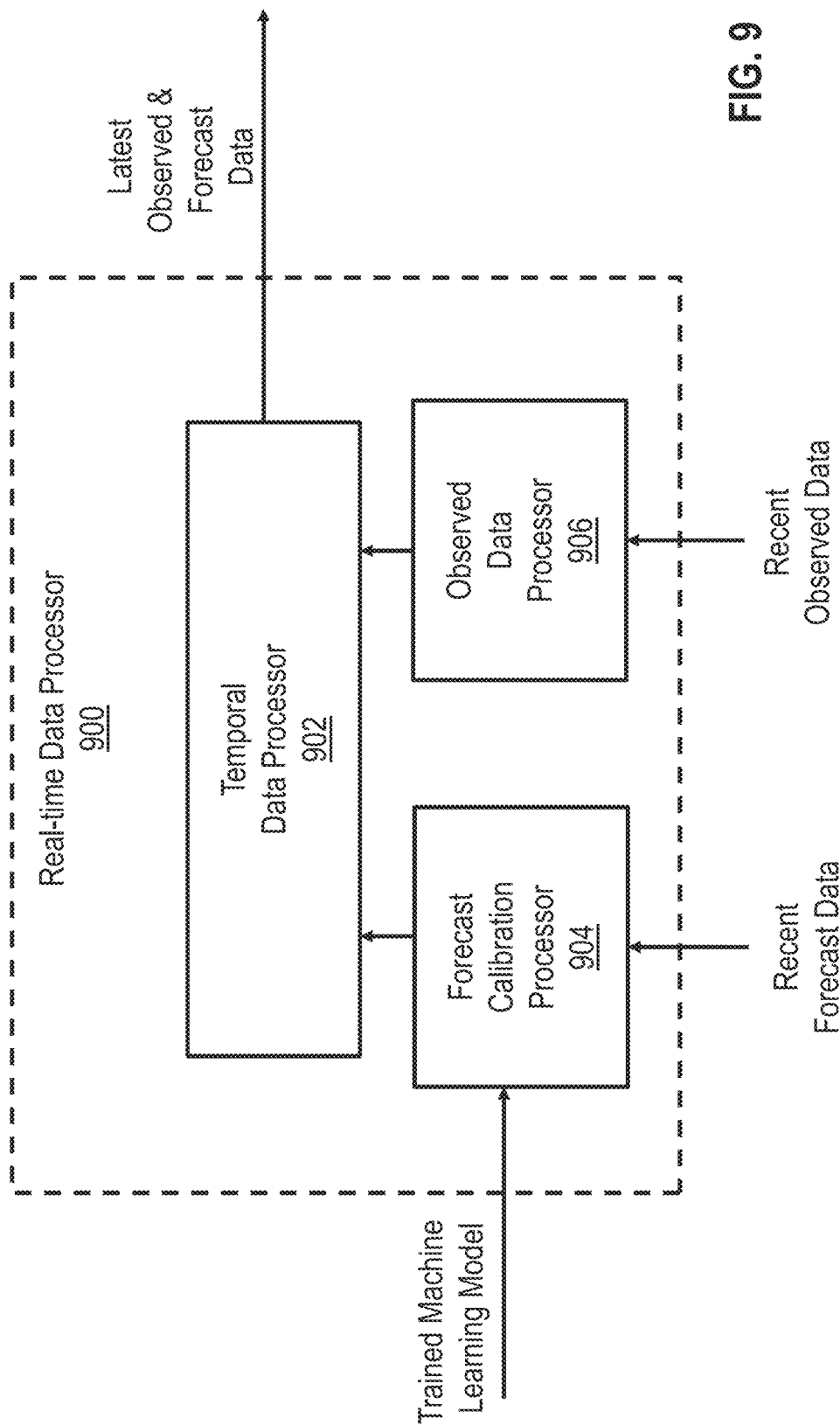
FIG. 9 shows an example embodiment of further details of a forecast post-processor.

FIG. 9 shows an example embodiment of further details of a forecast post-processor. In an embodiment, forecast post-processor is the forecast post-processor 900. In an embodiment, data processor 804 (FIG. 8) and the post-processor 900 are commonly configured or programmed. In an embodiment, post-processor 900 includes a forecast calibration processor 904, an observed data processor 906 and a temporal data processor 902. In an embodiment, forecast calibration processor 904 receives field-specific trained forecast model data from a pre-processor, such as the module 802 (FIG. 8). In an embodiment, forecast calibration processor 904 additionally receives recent or latest forecast data and calibrates in real time the recent forecast data using the machine learning model. In an embodiment, processor 904 is configured or programmed as a hardware module. In an embodiment, the processor 904 is a set of instructions that when executed carry out the calibration function. In an embodiment, the processor 904 is software or a virtual machine or any of the foregoing combinations.

In an embodiment, observed data processor 906 receives recent or latest observed data and processes the recent observed data. For example, processor 906 may process the recent observed data by pairing the recent observed data associated with one or more particular fields with corresponding recent forecast data of the same fields.

In an embodiment, temporal data processor 902 is configured or programmed to receive the recent forecast data and recent observed data for graphical representation via a user interface. In an embodiment, temporal data processor 902 is configured or programmed to blend field-specific recent precipitation forecast data with field-specific precipitation observed data to cover a gap between "past" and "now" in a timeline graph. "Past" represents recent observed data and "now" representing the beginning of recent forecast data. In an embodiment, temporal data processor 902 is configured or programmed to transmit the recent forecast data and recent observed data to a field data extractor, such as the field data extractor 808 (FIG. 8).

Figure 10:
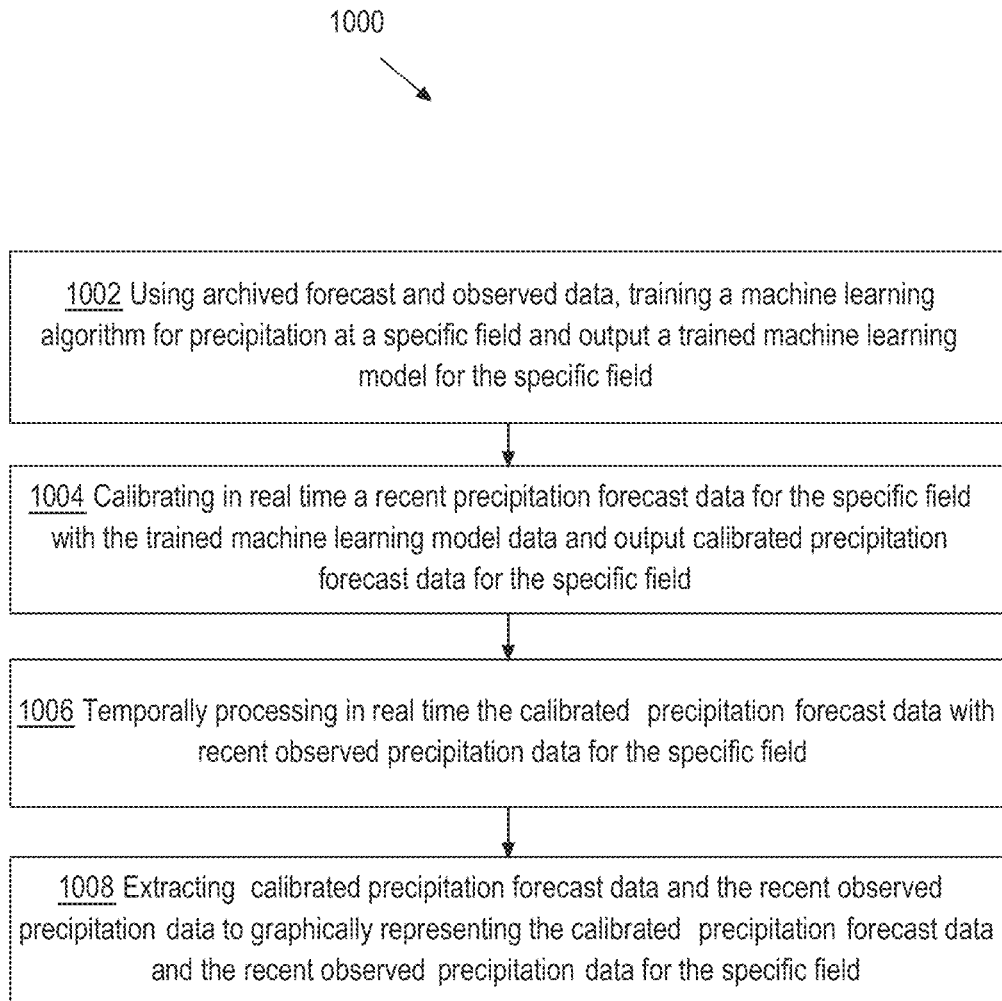
FIG. 10 shows an example method of forecasting precipitation at a specific field.

FIG. 10 shows an example method of forecasting precipitation at a specific field. In an embodiment, the method 1000 is a field-specific precipitation forecasting method. At step 1002, method 1000 includes using a long history of archived forecast model and observed data, training a machine learning algorithm for precipitation at a specific field and generating a field-specific trained precipitation machine learning model. In an embodiment, other suitable machine learning algorithms may be employed. At step 1004, the method includes calibrating in real time a recent precipitation forecast from the weather model for the specific field by applying the machine learning model to the raw precipitation forecast resulting in output of calibrated precipitation forecast data for the specific field. At step 1006, temporally processing in real time the calibrated precipitation forecast data with recent observed precipitation data for the specific field and at step 1008, the method includes extracting calibrated precipitation forecast data and the recent observed precipitation data to graphically represent the calibrated precipitation forecast data and the recent observed precipitation data for the specific field.

In accordance with an embodiment, growers are provided with a range of data periods to navigate in order to support a variety of short- and long-term decisions in farming operations. In an embodiment, growers are supported by a consistent temporal ratio between the past and future data to easily grasp the meaning of a graphical representation of the weather element forecast. In an embodiment, growers are supported by staying within predictability limits of the forecast to provide only useful forecast information. Consistent with the foregoing, several figures follow with examples of table and bar chart representations. In an embodiment, other weather elements may be forecast, and other types of graphical representations may be employed. In an embodiment, methods and embodiments may be applied to weather forecasts for other applications beyond farming. For example, it may be helpful for bikers to have easy access to accurate weather forecast specific to the area and time they plan to bike for planning purposes.

3.2 Graphical User Interface

A histogram display of precipitation amounts, at a specific geolocation, such as a grower field, over sequential intervals within an inclusive period of time can assist growers with reduced or eliminated risk factors and improved decision-making. In an embodiment, data interval and length of the total period presented by the display may be variable.

FIG. 11 shows an example table data relating to the variable-length data interval and total period of a display, which can be effectively employed to tailor a display to support short- or long-term planning. The table lists various forecast interval lengths, with observed (past) data presented for four data increments and forecast (future) data presented for ten data increments. Observed data length is the past length of time. The periods, or forecast interval lengths, may be various forecast periods of time that are of interest to a grower, such as, imminent, soon, workday, or full day. For each period, data increments are indicated. Data increments may be tied to bar width in a bar chart, for example. As an example, for a workday period, a bar chart may show a separate bar for each consecutive hour from four hours in the past through ten hours into the future. Observed, past data shown together with future, forecast data provides a more complete, temporal picture of the weather that the grower needs to evaluate options. For example, a grower can easily aggregate the recent past precipitation with the likely coming precipitation to evaluate whether a field may soon become too muddy to be worked.

In an embodiment, a precipitation graph may completely describe a forecast as a range of precipitation potential. In an embodiment, a variety of forecast lengths and temporal granularity may be presented to a user. For example, in a bar chart graph, forecast lengths may be depicted by the length of a bar chart graph and temporal granularity may be depicted by the bar's width within the chart. In an embodiment, forecast lengths and/or temporal granularity may be depicted differently or via a different type of graphical representation.

FIG. 12 shows an example precipitation bar chart graph and corresponding PDF graph. FIG. 12 shows a precipitation bar chart graph 1202 and corresponding PDF graph 1204. FIG. 12 covers a "work week" period. The bar is shown with three color ranges, bottom range, middle range, and top range. Temporal granularity is shown on the horizontal axis of graph 1202. In the example of FIG. 12, the temporal granularity is a 12-hour data interval, for example, from 6 pm to 6 am, nighttime, or 6 am to 6 pm, daytime. The vertical axis of graph 1202 shows the number of inches of precipitation. The forecast period is 5 days and the past period is 2 days. In an embodiment, different past data length, temporal granularity, and/or forecast lengths may be employed.

The current time, when a display graph 1202 is published, is on the horizontal timeline slightly to the left of the solid line 1208 so that to the right line 1208 is forecast precipitation. To the left of line 1208 is primarily past or observed precipitation data, except on occasion the final bar of observed precipitation, immediately to the left of line 1208, may be a combination of both observed and forecast data with the data time increment. For example, if that data increment goes from 6 am to 6 pm, and the current time is 11 am, then the bar for that increment is composed of observed precipitation from 6 am to 11 am plus the median forecast value from 11 am to 6 pm.

PDF graph 1204 shows a corresponding PDF with four distinct percentiles of distribution such as 10th, 50th, 90th and 98th percentiles. In an embodiment, different percentiles of distribution and/or different number of percentiles of distributions may be shown. Each of the four percentiles of graph 1204 corresponds to a breakpoint of a bar within graph 1202. For example, the tenth percentile at graph 1204 corresponds to the bottom range breakpoint of a bar in graph 1202. The 50th percentile, or median, at graph 1204 corresponds to the labeled part of a bar graph 1202, 0.3 in this example, the 90th percentile at graph 1204 corresponds to the middle range breakpoint at graph 1202 and the 98th percentile at graph 1204 corresponds to the topmost breakpoint at graph 1202.

Currently, growers cannot access a forecast PDF graph, similar to graph 1204 of FIG. 12, for example. PDF graphs are not easily comprehensible and do not readily convey the most relevant data a grower would need for effective decision-making and planning. A bar graph like graph 1202 is easily understood and captures events that may occur in the future in a manner permitting efficient review while also having prediction information that is not overwhelming.

At graph 1202, the bar shown at Thursday, 6 pm to Friday 6 am, has three distinct ranges. The middle range of the bar encompasses 80% of the probability. The middle of the middle range of the bar is the best-estimate prediction, 0.3 at the median of the distribution, shown at graph 1204. The distribution of graph 1204 shows what could happen in the future relative to precipitation, such that the eventual verifying value of precipitation is a random sample from the forecast PDF. The top and bottom ranges of the bar thus convey the tails of the PDF, or decreased probability relative to the middle range of the bar.

Figure 13:
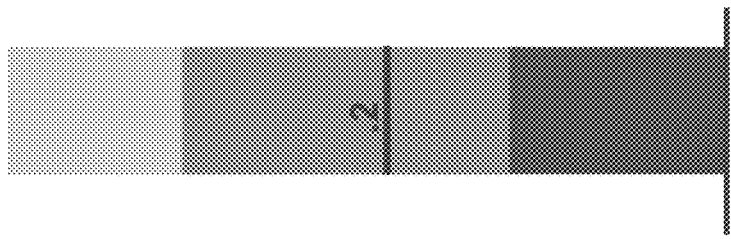
FIG. 13 shows example ways to interpret a bar representation on bar chart graphs.
Figure 14:
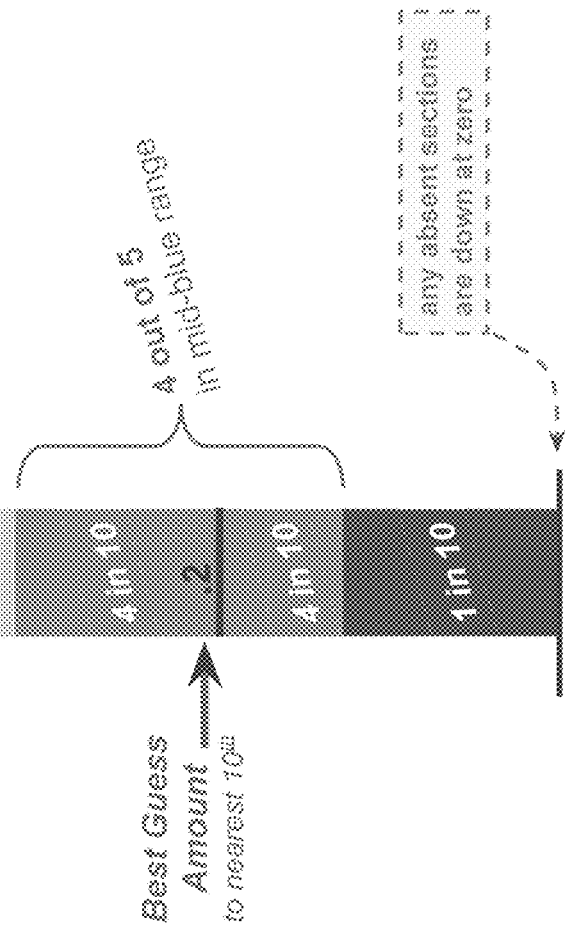
FIG. 14 shows example ways to interpret a bar representation on bar chart graphs.
Figure 15:
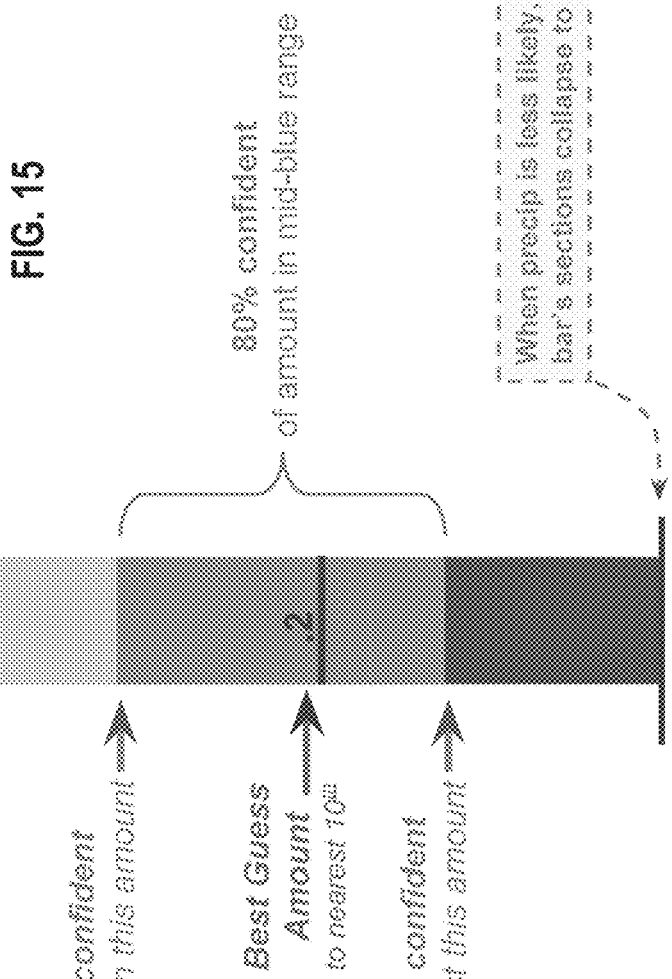
FIG. 15 shows example ways to interpret a bar representation on bar chart graphs.

Proper interpretation and comprehension of the data conveyed by the bars of forecast precipitation in graph 1202 is necessary for growers to effectively apply the information to farm operation decision processes. FIG. 13, FIG. 14, FIG. 15 show ways in which the bars can be interpreted.

FIG. 13 shows a color-range bar of forecast precipitation. In an embodiment, the bar is represented with three color ranges. In an embodiment, the confidence in getting at least the forecast amount of precipitation shown decreases in a direction from the bottom range to the top range of a bar. In an embodiment, different shading or colors designate distinct ranges. Distinct ranges, for example, enable a grower, at a quick glance, to view prediction information for a field for a particular period. For example, in the embodiment of FIG. 13, the bottom half of a bar indicates most confidence of at least some amount of precipitation and the top half of the bar indicates less confidence. Planning decisions are made more efficient and convenient. In an embodiment, graphical representations other than bar graphs may be employed.

FIG. 14 shows interpretation of the precipitation bar as an odds representation. The bar in FIG. 14 shows an example breakout of PDF percentiles. For example, four percentiles shown by graph 1204 of FIG. 12, are shown in FIG. 14 in odds. In an embodiment, a bar shows precipitation odds of occurrence, or the odds that a given precipitation amount will occur. In the embodiment of FIG. 14, the best guess prediction divides the entire middle range into two sections with odds of 4 out of 10 times for occurrence of the actual precipitation value. While higher odds convey information that may be key to planning, lower odds (more rare scenarios) can also convey valuable decision-making information. In FIG. 14, the top and bottom ranges each have odds of 1 out of 10 for occurrence of the actual precipitation value. The grower is not caught off guard in the event of these rarer occurrences. In an embodiment, graphical representations other than the bar graph of FIG. 14 may be employed. In an embodiment, the number of percentiles, percentile values or number of bar breakouts may differ.

FIG. 15 shows interpretation of the precipitation bar as an odds representation. The breakout at the bottom range indicates a 90% confidence level that at least a certain amount of rain, for example, as indicated by the bottom range of the bar chart, will occur. In opposite, the break between the middle and top ranges of the bar chart conveys a 90% confidence that the amount of precipitation will be no more than the amount indicated. There is an 80% confidence that the actual amount of precipitation will occur in the middle range. The topmost part of the bar represents the greatest possible amount of precipitation. In an embodiment, a confidence interpretation of the precipitation bar other than FIG. 15 may be employed. In an embodiment, different percentages and breakouts may be employed.

An example hypothetical of the usefulness of the precipitation bar chart 1202 is presented. A key aspect of agricultural planning is to avoid driving a tractor in a muddy field as the tractor can become stuck and/or the soil can become compacted. A rule of thumb is that a field that receives greater than 0.5 inches of precipitation within 24 hours is too muddy to work. Without the benefit of the bar chart or other suitable graphical representation, a grower is uninformed of this risk and may often make a poor decision. The best-guess forecast for Thursday night, which is equivalent to simple single-valued forecast available to the grower today, is 0.3 inches. Based only on this information of tolerable amount of rain Thursday night, a grower might reasonably, as most growers would, decide to proceed with the plan to plant this Friday. But the foregoing decisions can prove disastrous because the single-valued forecast is not telling the whole story.

Whereas, with the benefit of bar chart 1202, the grower sees the significant risk of getting much more than 0.5 inches of rain Thursday night, resulting in a very muddy field on Friday. Looking for more options, the grower sees that the forecast for tonight (Wednesday night) shows at most 0.4 inches. The grower may then decide to go ahead and prepare to plant tomorrow (Thursday), yet access the field in the morning. The grower's wise backup plan may be to hold off planting until this weekend when the forecast confidently shows dry conditions. The grower, armed with comprehensive weather information, is thus able to optimize planning and execution of the farming operations. While decisions may still not be perfect, and outcomes may be detrimental on occasion, the grower ultimately comes out ahead because he/she has a better chance of avoiding the possible bad outcomes. Repeated decisions based on the comprehensive precipitation information increase success by avoiding or eliminating risks.

In an embodiment, a bar of a bar chart/graph is effectively a description of the probability distribution of the prediction but presents a grower with a convenient representation instead of a complex graph or other mathematical description. A chart similar to that of bar chart 1202 conveys a forecast with ease, simplicity, and clarity. At a glance, it can allow a grower to benefit from a more optimized decision approach than would a PDF graph.

Figure 16:
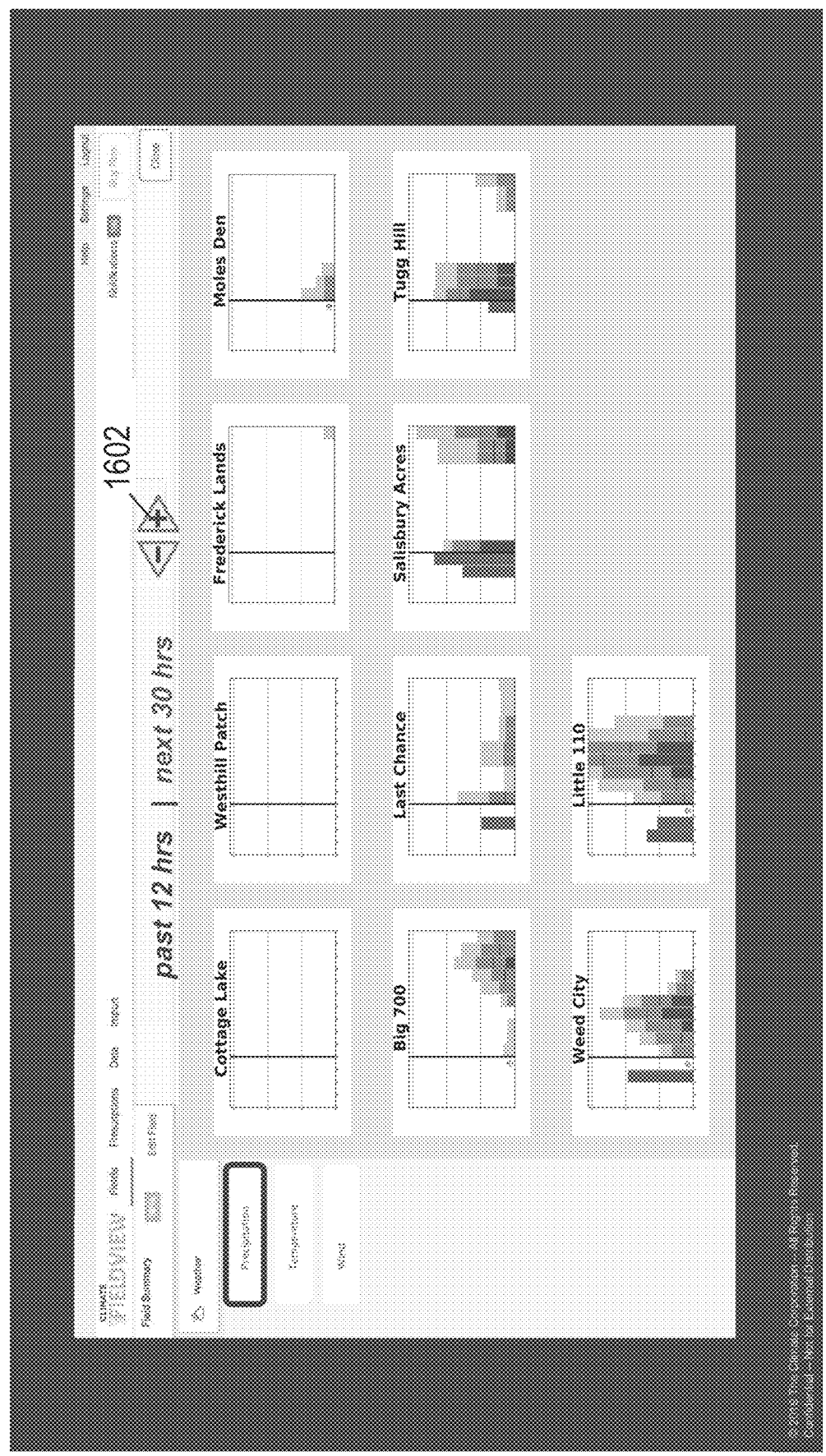
FIG. 16 shows an example thumbnail display of precipitation bar charts for multiple fields.

FIG. 16 shows an example thumbnail precipitation charts covering multiple fields. In an embodiment, a dashboard graphical representation of all fields' precipitation is presented. The dashboard representation enables a grower to engage in big-picture decisions. Bar chart graphs of fields distributed at various geolocations, like Cottage Lake, Big 700 and so on, are shown on a common viewing screen. The resolution of each forecast might not allow viewing detailed information about a specific field, but an overall view of all fields yields useful information. For example, the thumbnail view of FIG. 16 shows an order of the fields from the driest field to the wettest field. This presentation of field information has value to a grower. A grower may want to select only the dry fields for spraying, for example.

The thumbnail view in FIG. 16 includes configuration buttons. In an embodiment, configuration buttons enable user interaction by prompting a user to enter input specifying a user selection. In an embodiment, the response affects the user interface graphical representation. For example, the "− +" indicator at 1602, when activated, shrinks or expands the time period covered in the display. In response to a selection of "+", the time period may be expanded in both the future and past directions, and in response to "−", time may be reduced. In an embodiment, the graphical user interface may comprise other types of configurations for accepting a user's selection, such as without limitation, text entry boxes, drop-down menus or sliding scales.

Figure 17:
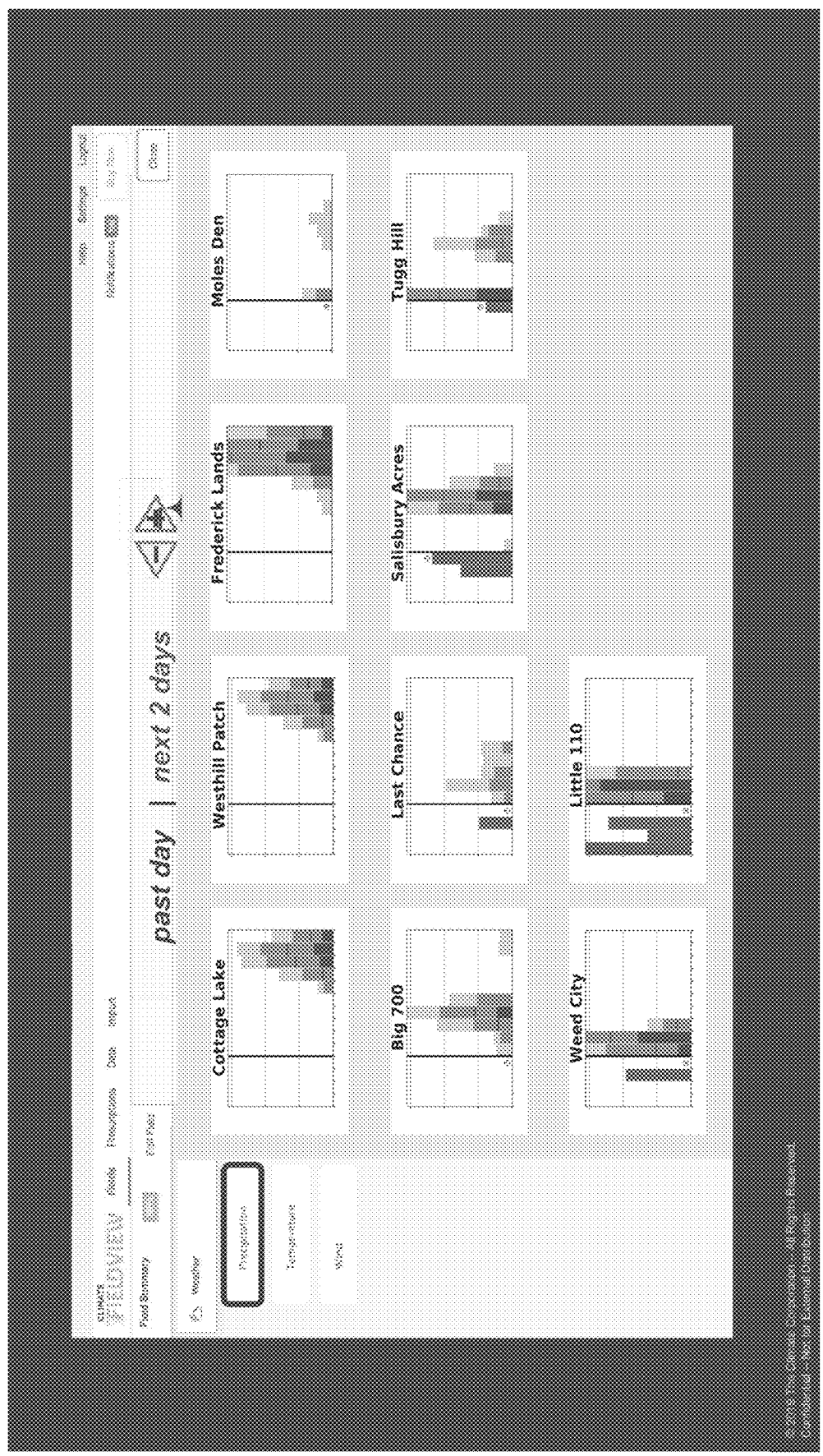
FIG. 17 shows a time-advanced display of FIG. 16.

FIG. 17 shows a time-expanded thumbnail graphical representation of FIG. 16. In an embodiment, a grower may make more appropriate decisions with the benefit of inquiring a variety of shorter or longer time periods of data.

Figure 18:
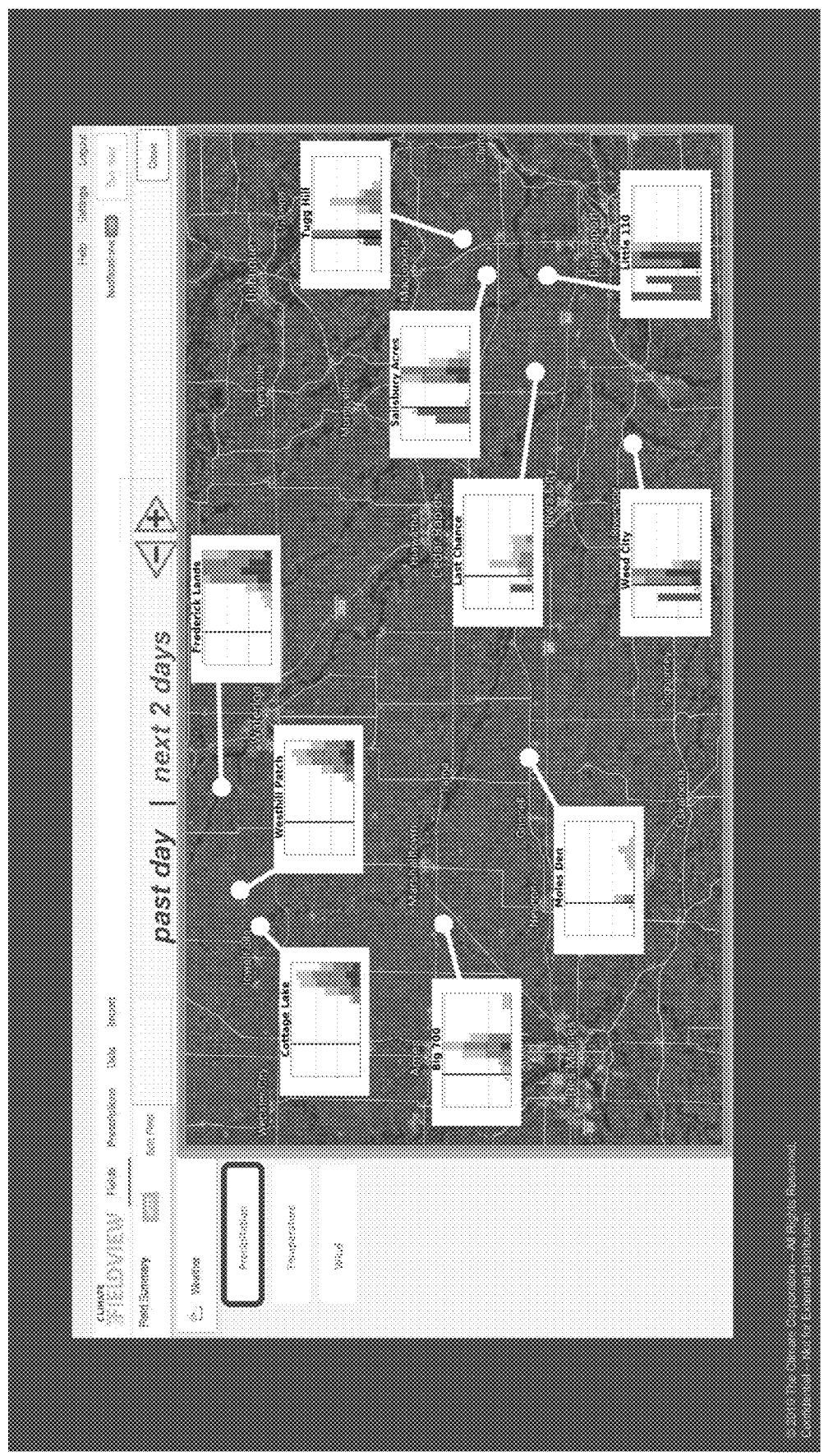
FIG. 18 shows a thumbnail display of precipitation bar charts for multiple fields on a map presentation.

FIG. 18 shows a thumbnail map presentation of precipitation bar graphs for multiple fields. In the example of FIG. 18, a spatial field map of field dependencies allows fields with matching characteristics to be grouped together, for example, helping with planning and making decisions. Dry vs wet fields are easily located and may play a key role in a grower's farm operations planning.

Figure 19:
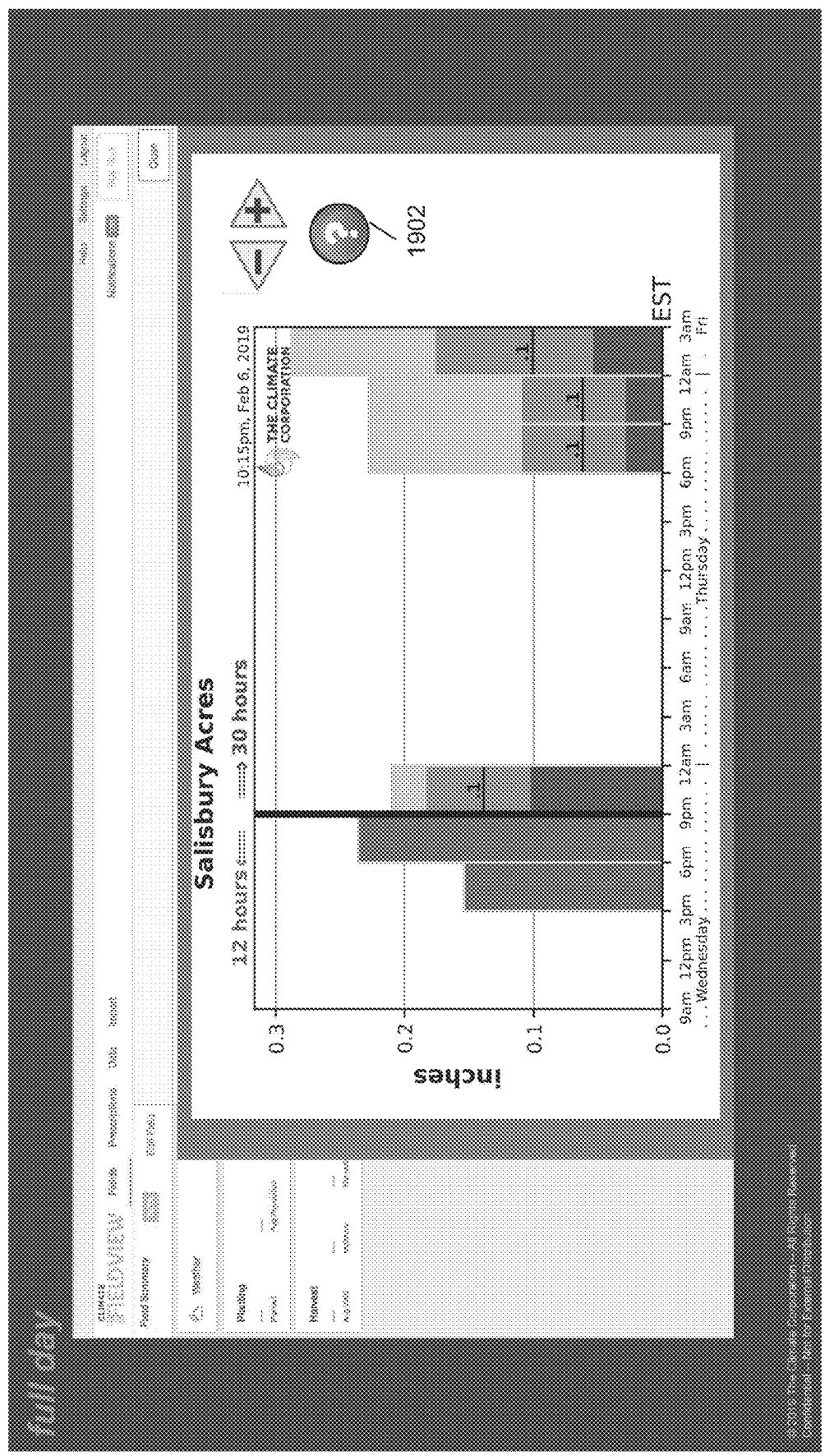
FIG. 19 shows details of a user selected field bar graph.

One or more fields can be selected for detailed viewing of a precipitation bar graph. FIG. 19 shows details of a user selected field bar graph. For example, upon selection of the Salisbury Acres field, a bar graph shows details of the past and future precipitation. In an embodiment, a configuration option is implemented, prompting a user to enter a user input specifying a user selection. For example, a 'help' indicator, at 1902, may be an option presented to a user where in response to a user selection through indicator 1902, a help menu is presented to assist the user in navigating various screens and associated configuration choices. In an embodiment, other types of configuration indicators may be employed.

4. Other Aspects of Disclosure

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

5. Practical Applications

Practical applications of various embodiments and methods include short- and long-term planning made possible by utilizing temporal granularity of specific forecast models. User interface graphical representations of past data and future forecasts with variable forecast lengths and details, and comprehensive and comprehensible viewing screens of forecast data help improve decision-making and planning, and reduce risk factors. Machine learning training on archived forecast model data and archived observed data improves forecast models to or near ground truth (observed data).

In an embodiment, the optimizing weather forecasting process is implemented as part of an agronomic or agricultural system. In various embodiments, the agronomic or agricultural system may involve an agricultural implement capable of applying treatments to a field. For example, the agricultural intelligence computer system may be installed and actively executing at an agricultural implement such as a pesticide spraying vehicle, the pesticide spraying vehicle being designed to traverse a field while spraying pesticides on a crop canopy. The agricultural intelligence computer system may allow a user to make real-time decisions on whether or not treatments should be applied to a field using the agricultural implement. For example, a computer and digital display attached to the sprayer and accessible by an operator of the sprayer may display weather data such as current and forecasted precipitation to the user. Precipitation has an impact on the effectiveness of sprayed treatments, and a user may choose to apply or abstain from applying sprayed treatments to a field based on the previous and expected precipitation in a field.

In an embodiment, the agricultural intelligence computer system uses previous model input and/or historical weather data to generate an accurate weather model for a field. For example, the agricultural intelligence computer system may receive examples of previously generated weather models. In an embodiment, the previous weather models are publicly available. In an embodiment, the previous weather models relate to nearby fields. For example, a weather model previously generated for an adjacent field to the current field is likely to provide the most accurate weather information in which to generate a forecast for a current field. In various embodiments, the historical weather data comprises actual measured weather values for a number of time periods in the past. Examples of actual measured weather may include measured precipitation values, humidity, windspeed, atmospheric pressure, temperature, or any other measured value relevant to agricultural or agronomic processes. In further examples, the measured values are associated with particular time periods, including a particular day, week, month, year, season, or time of day. In various embodiments, previous models as well as actual measured weather values are used together to generate the weather model. For example, a previously generated weather model may take, as input, actual weather data to output a forecast. The measured weather values may be input to the previously generated weather model to produce an output of a localized weather model associated with a field at which the actual values were measured.

In an embodiment, the agricultural intelligence computer system uses contemporary data received from local sources to modify the generated weather model. For example, an agricultural implement executing the agricultural intelligence computer system may receive, from weather sensors attached to the agricultural implement, real-time weather data. In an embodiment, receiving data in real time comprises receiving data instantaneously or nearly instantaneously in order to make more accurate decisions for contemporary field treatment techniques. In various embodiments, modifying the weather model comprises using contemporarily received weather data to make a real-time alternation to the weather model. For example, a weather model may predict that particular weather conditions should occur at a field at a current time. Contemporary weather data received at an agricultural implement may comprise weather data that is different than predicted weather data based on the model. The model may therefore need modification to more accurately predict conditions at the field. In an embodiment, the weather model is modified based on the difference between predicted weather data and measured contemporary weather data in a field. For example, a generated model may predict relative humidity of 50% in a field during a first hour, increasing by 5% per hour for the next six hours. An actual measurement of 60% humidity with an increase of 7% per hour for the next six hours may show that the generated model should be adjusted to predict a higher level of relative humidity and higher levels of increased humidity during similar time periods. Continuously adjusting a weather model with actual measured information and data allows for optimization of a weather model to provide more accurate predictive data to the agricultural intelligence computer system, thereby improving associated agricultural practices.

In various embodiments, displaying the modified and improved forecasts for one or more fields improve associated agricultural practices by providing a user of the display with accurate and real-time forecast information to aid in field treatment practices. For example, installation of a display at an agricultural implement or near an agricultural implement may allow a user of the implement to make more accurate and time-sensitive decisions to optimize crop treatments. In an embodiment, displaying forecast results of a modified model in real-time allows an operator of an agricultural implement to decide the best practices to use that agricultural implement relative to current and predicted weather conditions. For example, an operator of an implement that spreads fertilizer in a field may access information relating to forecasted precipitation in that field. Because both the volume and rate of rainfall greatly affects the ability of soil to absorb nutrients, an operator of a fertilizing implement may reduce, increase, or abstain from certain activities in anticipation of predicted precipitation events, in real-time.

6. Benefits of Certain Embodiments

When considered in light of the specification herein, and its character as a whole, this disclosure is directed to improvements in the weather recognition, modeling, modification and user-implemented processes to generate and utilize and optimized weather models to improve agricultural techniques. The disclosure is not intended to cover or claim the abstract model of determining, manipulating and outputting data, but rather, the technical improvement or using predictive and measured data to improve weather modeling and display it in a manner that will greatly benefit active users of an agricultural intelligence computer system. By accounting for historical models and data, contemporary and real-time data taken from a field and generated and modified models, the system is additionally able to improve the accuracy, reliability, and usability of treatment models while preventing otherwise unaccountable complications with field treatments due to unstoppable weather changes. Thus, implementation of the invention described herein may have tangible benefits in increased agronomic yield of a crop, reduction in resource expenditure while managing a crop, and/or improvements in the crop itself.

What is claimed is:

1. A computer-implemented method, comprising:
    obtaining, by a processor, an ensemble of weather models for forecasting weather conditions at a field associated with an agricultural operation;
    obtaining, by the processor, output data from executing the ensemble of weather models for a past period of time;
    receiving observed weather data for the past period of time;
    generating, by the processor, calibrating data from the output data and the observed weather data, using machine learning techniques;
    updating the ensemble of weather models to an ensemble of updated weather models based on the calibrating data;
    executing the ensemble of updated weather models for a future time to generate a list of weather forecasts for the field;
    computing a probability distribution function (PDF) based on the list of weather forecasts;
    causing displaying a stacked bar graph based on the PDF.

2. The computer-implemented method of claim 1, the generating comprising matching up the output data with verifying observations over archived cases.

3. The computer-implemented method of claim 1, at least one of the ensemble weather models generating a prediction related to precipitation, wind, or temperature.

4. The computer-implemented method of claim 1, the executing the ensemble of updated weather models comprising receiving real-time data as input data to the updated weather models.

5. The computer-implemented method of claim 1, further comprising causing a display of field-specific calibrated forecasts of the list of weather forecasts with field-specific recently observed weather data.

6. The computer-implemented method of claim 1, further comprising blending field-specific calibrated forecasts of the list of weather forecasts with field-specific recently observed data to cover gaps in the output data.

7. The computer-implemented method of claim 1, the updating comprising identifying differences between the observed weather data and the output data at a specific field location over a long history of matchings.

8. The computer-implemented method of claim 1, the observed weather data being received from in-field or remote sensors, satellites, or lasers.

9. The computer-implemented method of claim 1, further comprising:
    detecting a condition for a trend in the output data;
    adjusting the output data according to the trend when the condition is satisfied.

10. The computer-implemented method of claim 1, the observed weather data including observed precipitation data being rain-gauge based quantitative precipitation estimation (QPE).

11. The computer-implemented method of claim 1, the machine learning techniques including a quantile regression forest.

12. The computer-implemented method of claim 1, the stacked bar graph comprising bars being stacked in one direction and corresponding to increasing percentiles, with an axis along that direction corresponding to an increasing amount of precipitation.

13. The computer-implemented method of claim 1, the stacked bar graph comprising bars being stacked in one direction and corresponding to different ranges of odds, including two identical ranges of odds, with an axis along that direction corresponding an increasing amount of precipitation.

14. The computer-implemented method of claim 1, the stacked bar graph comprising bars being stacked in one direction and corresponding to decreasing odds of reaching a corresponding amount of precipitation, with an axis along that direction corresponding to an increasing amount of precipitation.

15. The computer-implemented method of claim 3, the generating comprises comparing precipitation estimates with a rain gauge or sensor value.

16. The computer-implemented method of claim 5, further comprising updating the display at a predetermined frequency.

17. One or more non-transitory computer-readable media storing instructions which, when executed by one or more processors, cause the one or more processors to perform comprising:
- obtaining an ensemble of weather models for forecasting weather conditions at a field associated with an agricultural operation;
- obtaining output data from executing the ensemble of weather models for a past period of time;
- receiving observed weather data for the past period of time;
- generating, by the processor, calibrating data from the output data and the observed weather data, using machine learning techniques;
- updating the ensemble of weather models to an ensemble of updated weather models based on the calibrating data;
- executing the ensemble of updated weather models for a future time to generate a list of weather forecasts for the field;
- computing a probability distribution function (PDF) based on the list of weather forecasts;
- causing displaying a stacked bar graph based on the PDF.

18. The one or more non-transitory computer-readable media of claim 17, wherein the updating comprising identifying differences between the observed weather data and the output data at a specific field location over a long history of matchings.

19. The one or more non-transitory computer-readable media of claim 17, wherein the instructions, when executed by the one or more processors, further cause the one or more processors to perform:
- detecting a condition for a trend in the output data;
- adjusting the output data according to the trend when the condition is satisfied.

* * * * *